United States Patent [19]

Crossley

[11] Patent Number: 4,822,397
[45] Date of Patent: Apr. 18, 1989

[54] METHOD FOR MAKING TAXIDERMIC EYES

[76] Inventor: John W. Crossley, Box 434, Geigel Hill Rd., Upper Black Eddy, Pa. 18972

[21] Appl. No.: 32,024

[22] Filed: Mar. 30, 1987

[51] Int. Cl.⁴ .................................... C03B 23/025
[52] U.S. Cl. ...................... 65/107; 65/60.1; 65/61; 65/71; 65/105; 65/273
[58] Field of Search ............... 65/105, 61, 60.1, 107, 65/110, 273, 71

[56] References Cited

U.S. PATENT DOCUMENTS

| | | | |
|---|---|---|---|
| 336,666 | 2/1886 | Ripley | 65/71 |
| 632,008 | 8/1899 | Dorpols | 65/60.1 |
| 1,048,227 | 12/1912 | Staubel | 65/61 |
| 1,551,351 | 8/1925 | Wayringer | 65/105 |
| 2,348,905 | 5/1944 | Hopfield | 65/107 X |
| 2,682,730 | 7/1954 | Rossen | 65/273 X |
| 3,607,186 | 9/1971 | Bognar | 65/107 X |
| 4,088,470 | 5/1978 | Bourg et al. | 65/105 |
| 4,300,933 | 11/1981 | Thomas et al. | 65/60.1 |

*Primary Examiner*—Arthur Kellogg
*Attorney, Agent, or Firm*—John J. Simkanich

[57] ABSTRACT

A method of manufacturing taxidermic glass eyes and the like utilizes flat sheets of glass. This glass is printed with the markings and coloring for the eye image. The printing is accomplished by silk screening or other production methods. The eye is then shaped by heating the glass to a plastic state while being positioned over an opening. The heated glass slumps to form the eye shape. Excess material is trimmed away once the glass has cooled. A double wall, parabolic curve taxidermic eye is thereby provided.

47 Claims, 7 Drawing Sheets

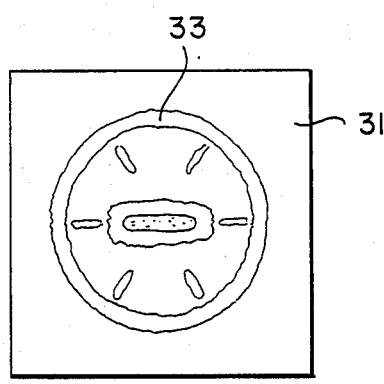
FIG. 3
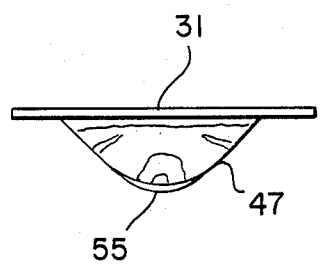
FIG. 4
FIG. 5A
FIG. 6A
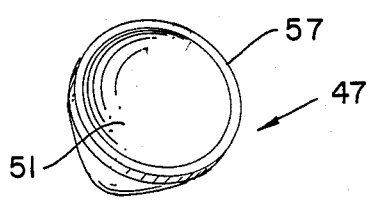
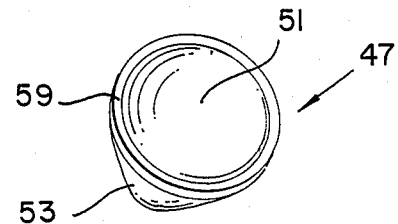
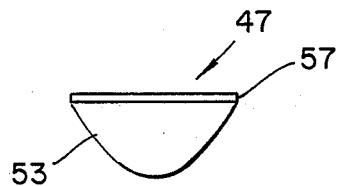
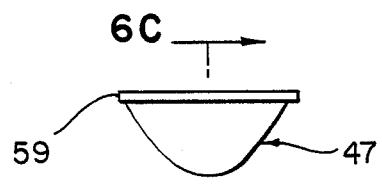
FIG. 5B
FIG. 6B
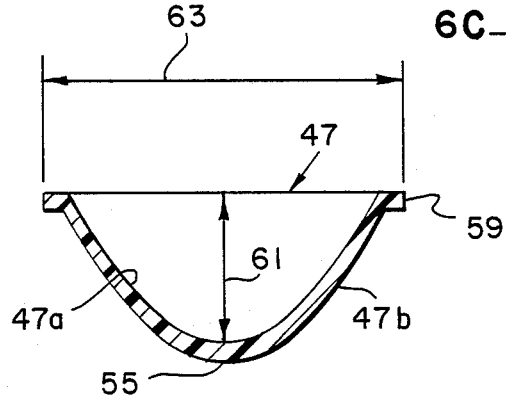
FIG. 6C

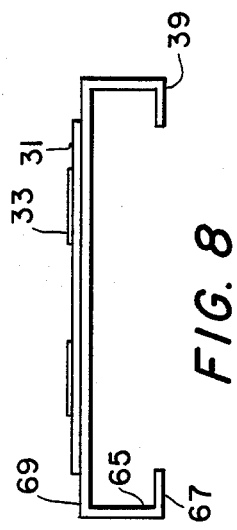
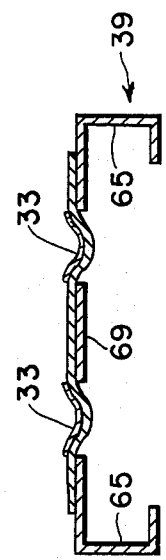
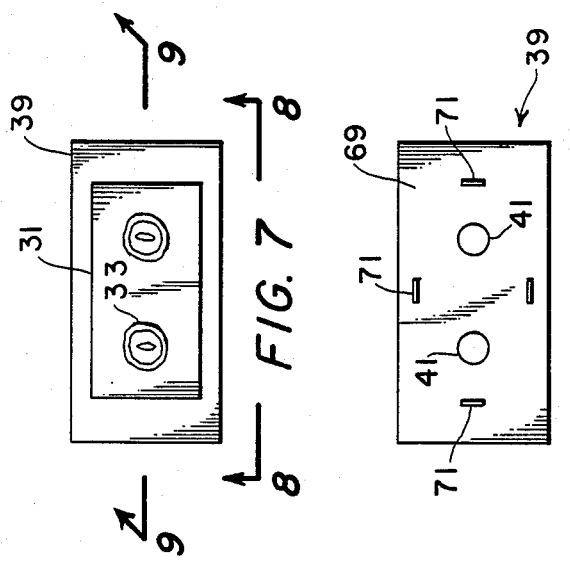
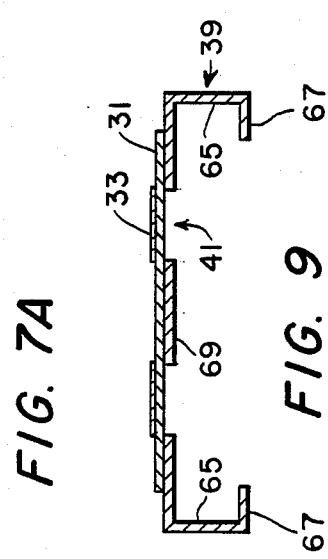

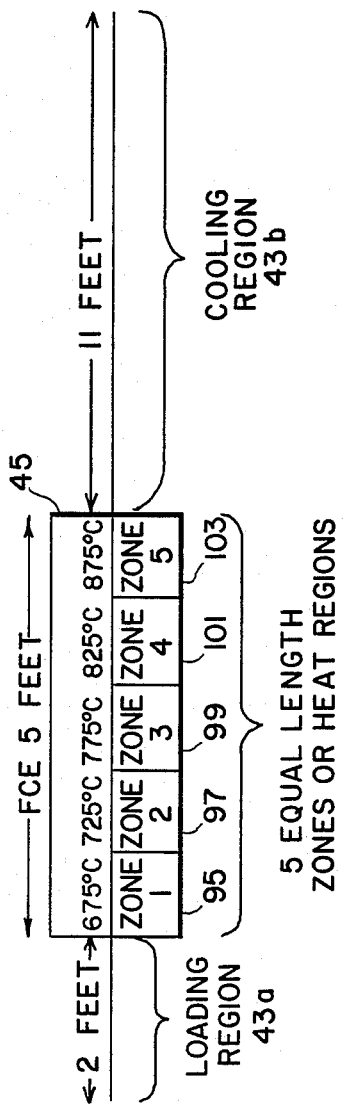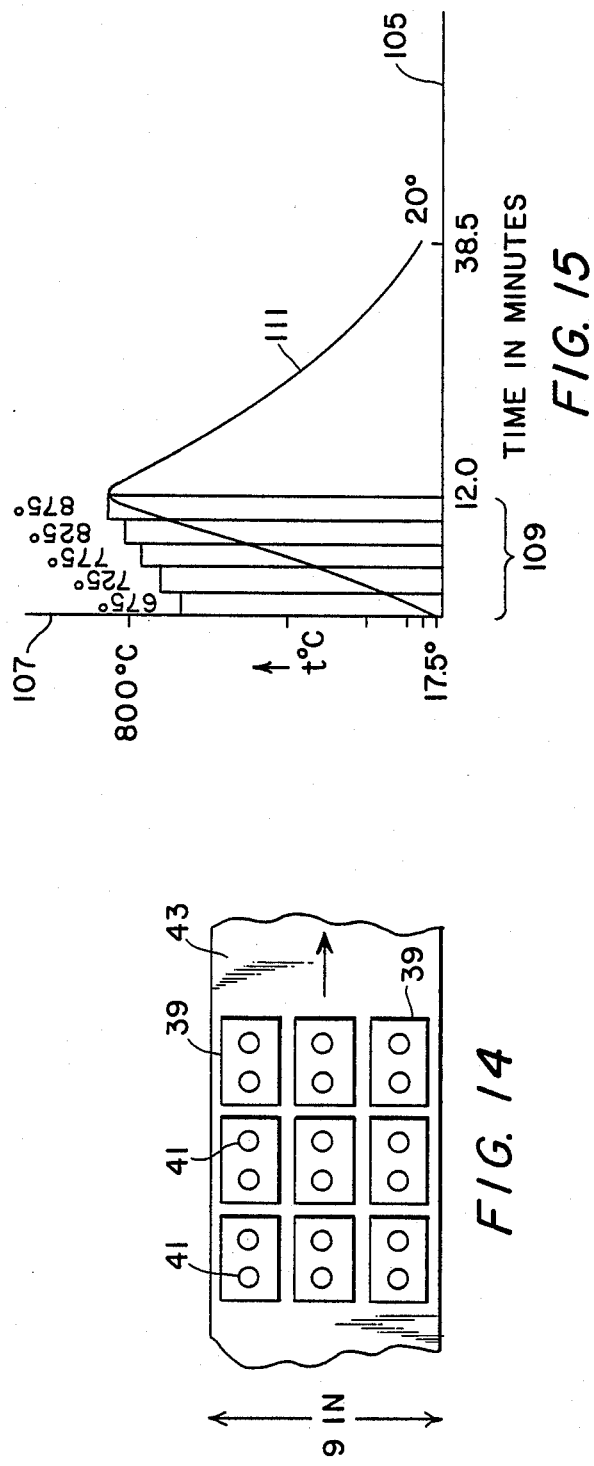

METHOD FOR MAKING TAXIDERMIC EYES

BACKGROUND OF THE INVENTION

This invention relates to the manufacture of taxidermic glass eyes and eyes used in dolls and manikins. The invention further relates to the apparatus used for this manufacturing process and to the eye product made as a result of this manufacturing process.

Taxidermic and doll eyes are hemispherical and usually have a round (spherical) outer surface. Other eyes, such as thoe provided by Tohickon Corporation of Erwinna Pa., can have a parabolic, (a-spheric) outer surface.

These eyes are normally hollow, i.e., they have a convex outer surface and a concave back. Markings are typically placed on the concave back of an eye blank to create an eye image. This allows for the glass wall of the manufactured eye to simulate the lens of a real animal or human eye.

Heretofore, the manufacture of these eyes has been a slow and tedious process. The blanks would first be manufactured usually from clear, optical grade glass. These blanks could be manufactured using a two part die in a press manufacturing process. A first die part is used for the shape of the outer (convex wall) surface and the second die part for the shape of the (concave wall) back.

Once the blanks cool, they are trimmed and the edges ground.

Eye markings or decorations are then painted onto the concave back by hand. Sometimes guides and templates are utilized. Thereafter, the painted surface is cured to complete the process.

It is desirable to develop a method of mass producing these eyes. To do this several factors must be overcome.

The first factor is that a less expensive and easier method of shaping the blanks should be found.

The second factor is that an easier method of placing the markings on the concave surface of the back of each blank should be found. Heretofore, as all painting of markings was done by hand, silk screen printing and decals could not be used as these methods require a flat surface for reliable and accurate reproduction.

SUMMARY OF THE INVENTION

An object of the present invention is to provide a method of manufacturing glass taxidermic eyes and the like in mass production.

A second objective of this invention is to provide such a method whereby the color and graphic markings for such an eye image is placed on a section of glass prior to it being formed into an ocular or eye shape.

A third objective of this invention is to provide a method where the glass can be formed in the eye shape with the color and graphic markings in place in such a manner that these markings are not distorted during the ocular shape forming operation.

A fourth objective of this invention is to provide an eye with a parabolic (a-spherical) outer surface curvature and a parabolic inner surface (i.e., the back) curvature.

The above objectives are achieved with an improved method and apparatus for making taxidermic eyes and the like and whereby taxidermic eye is created by this manufacturing process with a parabolic outer surface and a parabolic inner surface.

A sheet of optical grade glass is silk screened or otherwise imprinted with the pattern markings and coloring for the iris, pupil, etc. of a desired eye. These pattern markings and coloring are created with materials which withstand the softening temperatures of glass.

The glass sheet carrying the pattern is then placed on a carrier having as a part, thereof, a circular or other shaped opening. This opening creates the mold or die for the ocular shape forming operation. The pattern carrying portion of the glass sheet is centered over the opening during forming.

The glass is then heated and as the temperature rises the glass softens. While in the plastic state the glass slumps from its own weight to form a parabolic shape. Depending upon the amount of heat the wall thickness may be increased at the apex of the curvature. Once the shape is formed, the glass is removed from the heat and allowed to cool slowly so that it will anneal.

A section of the glass containing an ocular shape is cut or sliced away from the sheet. Excess glass formed by the sheet is ground away from the eye. An annular lip can be left at the base of the eye or all of the glass in the plane of the sheet can be removed.

The manufacturing process requires printing equipment for depositing a pattern on the glass. The pattern is a composite in vitreous enamels as used in the ceramic coloring and overglazing arts.

The carrier mold or die can be made from steel sheet and a mold release can be used. Other materials such as carbon can be used for the mold where a mold release material is not needed.

The glass can be heated in a kiln or other chamber in a batch process or in a conveyer belt process. With a conveyer belt process, belt speed can be established and heat zones can be adjusted to control the heat up and cool down of the glass.

The product is a free-formed generally parabolic outer shaped ocular prosthesis where the wall thickness is slighly greater at the apex and the depth of the curvature is slightly less than one half the diameter across the base.

The dimensions and size of the eye can be adjusted with the thickness of the glass used, the size of the circular opening in the mold and the amount and duration of heating.

DESCRIPTIONS OF THE DRAWINGS

The advantages, features and operation of the present invention will be readily understood from a reading of the following Detailed Description of the Invention in conjunction with the accompanying drawings in which like numerals refer to like elements and in which:

FIG. 3 is a top plan view of a preprinted flat blank used in manufacturing the taxidermic eye;

FIG. 4 is a side elevation view of the preprinted flat blank of FIG. 3 after it has gone through the forming operation;

FIG. 5A is a perspective view of a finished taxidermic eye following grinding to remove all glass extending outwardly from its base;

FIG. 5B is a side elevation view of the taxidermic eye of FIG. 5A;

FIG. 6A is a perspective view of a finished taxidermic eye following grinding to leave an annular lip at its base;

FIG. 6B is a side elevation view of the taxidermic eye of FIG. 6A;

FIG. 6C is a sectional view of the taxidermic eye of FIG. 6B showing the wall thickness of the eye and the parabolic inner and outer surface shapes and the slightly thicker wall thickness at the apex of the curve;

FIG. 7 is a top plan view of a carrier mold used to hold the flat glass sheet of FIG. 3 with the preprinted glass sheet in place and printed for manufacturing two eyes;

FIG. 7a is a top plan view of a carrier mold used to hold a section of glass and carrying positioning guides, for positioning the section;

FIG. 8 is an end elevation view of the carrier mold and sheet taken as shown in FIG. 7;

FIG. 9 is a vertical sectional view of the carrier mold and sheet taken as shown in FIG. 7 prior to slump forming;

FIG. 10 is a vertical sectional view of the carrier mold and sheet taken as shown in FIG. 8 after slump forming;

FIG. 13 is a diagram of the heat zones and dwell times of each sheet of glass as it passes through the heat forming operation for a specific set of specifications of glass chemistry, sheet thicknes, eye base circle diameter and slump dimension (extension distance);

FIG. 14 shows a top plan view of a loaded conveyor belt section for mass production;

FIG. 15 shows a temperature curve for the process specifications of FIG. 13;

DETAILED DESCRIPTION OF THE INVENTION

The present invention provides a method of mass producing taxidermic eyes from glass or other construction materials used to make ocular prosthesis all of which go into a plastic state of flow when subjected to temperature gradients. Glass, especially optical grade glass, has been the preferred structural material for manufacturing taxidermic eyes, dolls eyes and manikin eyes. However, as certain types of resinous materials have come into use for optical lenses these materials are contemplated as being within the scope of this invention.

Taxidermic eyes, have been traditionally made hemispherically-shaped, with either a flat back surface or a concave back surface. Usually this concave back surface has been round (spheric). The outer surface of each eye (front face curvature) has been either round (spheric) or parabolic (aspheric). It is desirable to have a taxidermic eye which most closely approaches a real eye in appearance and structure. For this, it is advantageous to develop a cornea region projection at the apex of the front face curvature. Thus an a-spheric shape (parabolic) should be provided with an enlarged wall thickness at the apex of the curve.

Figure 1:
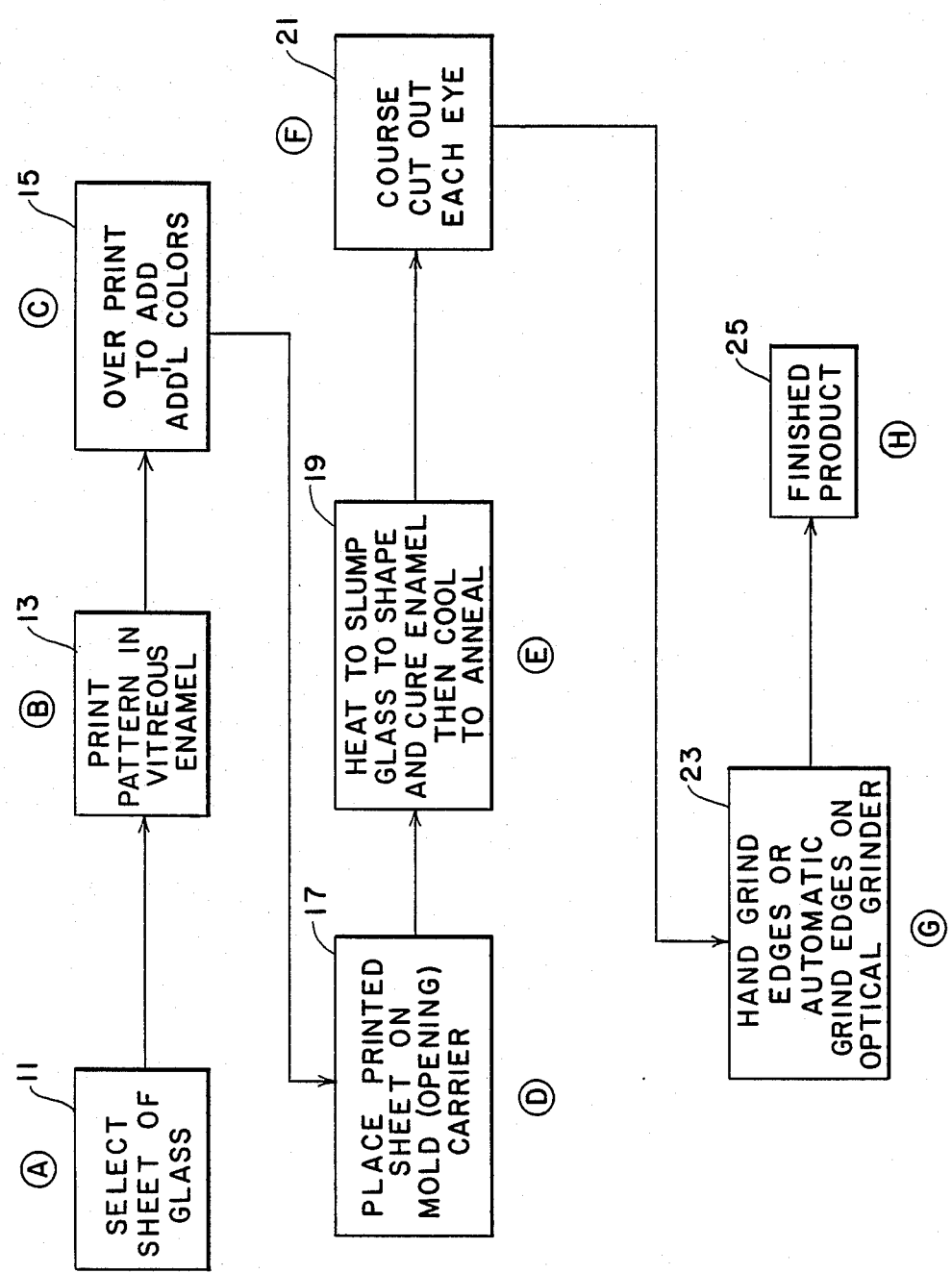
FIG. 1 is a block diagram presentation of each of the steps (A) through (H) which comprise the manufacturing process of the subject invention.

A method of manufacturing taxidermic eyes has been developed and includes, FIG. 1, first selecting 11 a sheet of glass from which one or more eyes will be manufactured. Following this, a pattern is printed 13 in vitreous enamels on the glass sheet. Or where other materials are used in manufacture, the pattern materials are selected to have similar thermal properties to the sheet material selected. One pattern is printed for each eye to be manufactured from the sheet of glass. The printed patterns are spaced sufficiently for allowing enough waste to permit rough cutting clearances between formed eyes.

Next, additional pattern layers are overprinted 15 to add additional colors. This is similar to the pottery glazing and china or dish technology, where an additional layer is used to provide each color addition to a pattern. The total composite pattern resulting from steps 13 and 15 provides an optical presentation of the body, the iris and the pupil of the eye.

The preprinted sheet is then placed 17 on a carrier pallet containing a plurality of circular openings. The placement is such that each printed pattern is positioned over each circular opening. The printed pattern side of the sheet faces upwardly while the bottom face of the sheet is not printed. Each opening in the carrier forms the mold for manufacturing an individual eye.

The glass sheet is then heated 19 to raise the temperature of the glass into a plastic state. When the glass reaches its softening temperature, it will begin to slump through the mold opening under its own weight. This is a gradual process. The vitreous enamel pattern on the top face of the sheet will, likewise, be raise to a plastic state and flow with the glass. This slumping creates a parabolic shape or curvature to the glass with a slight pooling or increased wall thickness at the apex of the curve. This pooling creates the cornea look for the eye. Following this slump formation of the eye shape, the mold holds the eye suspended and the glass is then allowed to cool to anneal, thereby reducing any stresses which have been introduced into the glass. The enamel pattern does not noticeably distort during this heat forming.

Following this step 19, each eye is course-cut 21 or diced from the sheet. This course-cutting step 21 provides a plurality of approximately rectangular shaped squares of glass with an eye formed in the center thereof and projecting outwardly from the plane of the glass. Each eye then has the excess glass ground away either by hand grinding or by automatic optical grinding 23. This grinding 23 removes the glass sheet material at the base of the eye to leave a finished bevel surface. The finished product 25 is then inspected and packaged for shipment.

This manufacturing process, FIG. 1, provides for the use of machine implementation of various process steps. This machine implementation results in greatly increased production capabilities over the previously employed hand labor manufacturing process.

Figure 2:
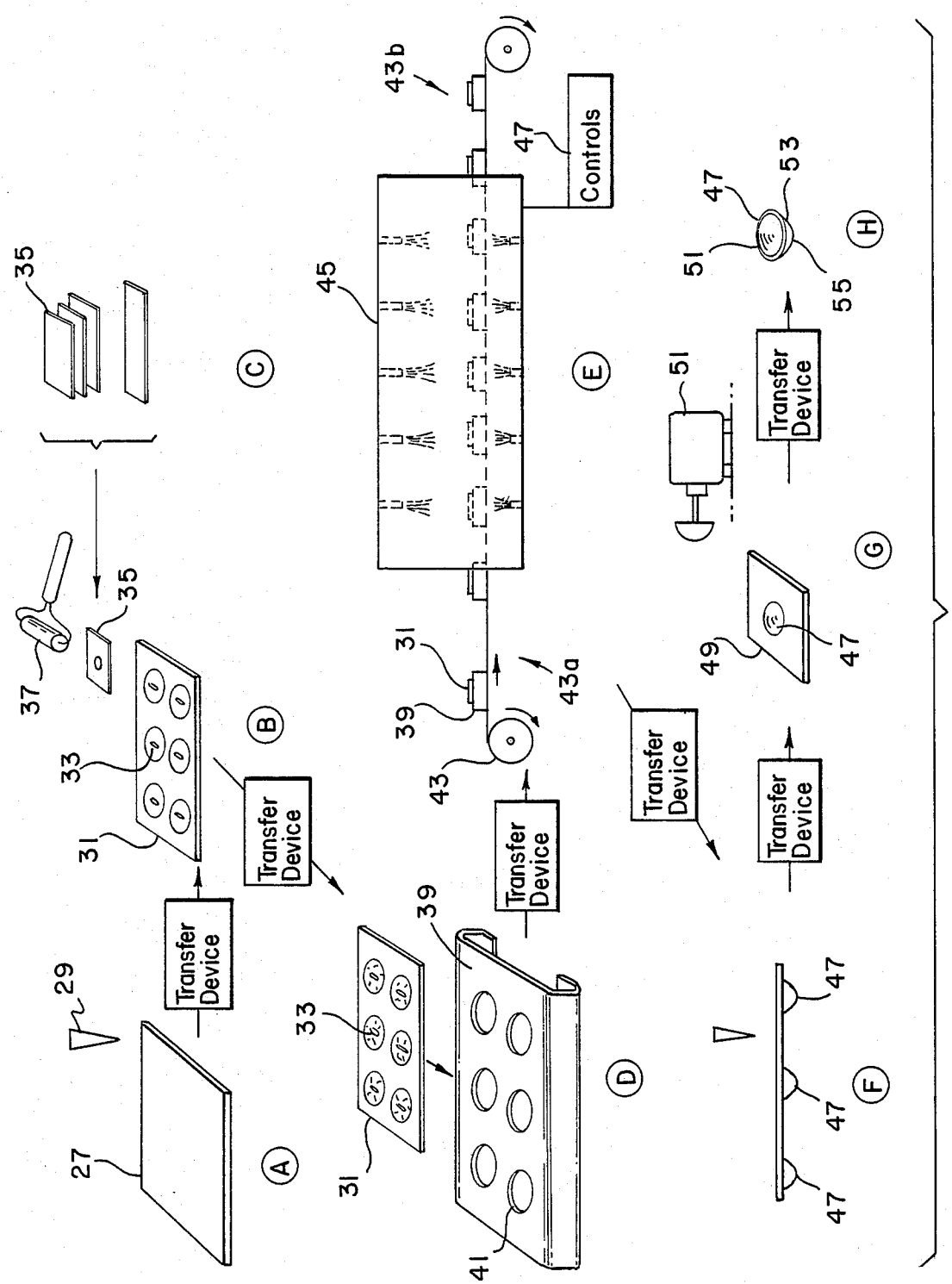
FIG. 2 is a graphic presentation of each of the steps (A) through (H) of FIG. 1, including illustrations of the equipment utilized in the manufacturing process.

The process steps 11 through 25 are further illustrated in FIG. 2 with the equipment used. A sheet of glass 27 is selected for manufacturing the eyes. This glass 27 can be optical quality glass as is commercially available from the Schott Optical Glass Company of Durean, Pa. It is specified as type B270 water white glass which does not contain iron. This glass is purchased in sheets of various sizes, thicknesses and temper.

In the manufacturing of taxidermic eyes, glass sheet 27 in the thickness range of 1 millimeter to 4 millimeters is most often used. The thickness of the glass sheet 27 can go beyond this thickness range and it is contemplated that these other thicknesses are still within the scope of this invention. As will be discussed below, various factors, including the thickness of the glass, affect the shape of the finished product. Other then the thickness of the glass 27, the size of the circle of the die (mold opening size), the amount of heat imparted to the glass, and the rate of heat increase can also be used to modify the shape of the finished product 25.

The glass sheet 27 is cut or diced into smaller sections by scoring with a knife 29 or by cutting. A section of glass 31 is sized to allow about 20% waste material surrounding each eye pattern 33 which is placed on that section of glass 31. Taxidermic eyes normally are made in sizes from about 10 millimeters in diameter at the base to 30 millimeters or more, and often up to 50 millimeters or more in diameter at the base. The base of the eye is defined by the circular plane at the back of the eye.

The eye pattern 33 is developed using a series of masks 35 and by spraying, printing, rolling or otherwise depositing a specific color material through a specific mask. A roller 37 can be used. Additional masks 35 are selected for pattern definition and color definition. These pattern development techniques have been used in the illustrating arts, the printing and pattern arts, the graphic arts and in the electronic semiconductor arts. The coloring is done with vitreous enamels which contain colored glass particles.

The section of glass 31 which carries a single or a plurality of the completed eye patterns 33 is then placed on a carrier or mold pallet 39. This carrier contains one or a plurality of circular openings 41. There are sufficient openings 41 on this carrier 39 to mold each of the patterns 33 into the desired ocular shape. Other sizes of the carrier 39 can be used which are larger or smaller than the six circular opening 41 carrier 39 shown in FIG. 2. It is immaterial whether the eyes made from the pattern 33 are made in pairs, i.e., the double row shown in FIG. 2, or made in a single row or in plural rows of three or more. The size will depend upon the other equipment selected and used.

Each carrier 39 bearing its preprinted glass section 31 is then loaded on a moving conveyer belt 43. The conveyor belt 43 passes through a heating apparatus 45 which is used to heat each of the glass sections 31 resting on each carrier 39 as they pass through this heating apparatus 45. The heating apparatus 45 can incorporate any of a number of known heat sources, such as gas or propane fired, electrical resistance heating, microwave heating, or infrared heating.

The heating apparatus 45 utilized in the process embodiment illustrated in FIG. 2, is commercially available from BTU Engineering Corporation of North Billerica Mass. It is a fast firing thick film furnace, model TEP-1. This furnace 45 is gas fired and includes a control console 47 which is microprocessor driven.

The controls 47 provide a microprocesor based control system for controlling both the heat in one or more zones of the furnace 45 and the rate of travel of the conveyor belt 43 through the furnace 45. The controls 47 are provided by the Bruce Systems subsidiary of the BTU Engineering Corporation and are commercially available as model 7354-M. This heating system, comprising the furnace 45, the conveyor belt 43 and the controls 47, is covered by a number of patents the disclosures of which are intended to be incorporated herein by reference. These patents include: U.S. Pat. Nos. 3,041,056; 3,179,392; 3,410,544; 3,138,372; 3,582,054; 3,615,082; and 3,618,919.

The feed length 43a on the conveyor belt 43 and the discharge length 43b of the conveyor belt 43 can be adjusted from that originally provided by the manufacturer, as will be further described below.

Once the glass sections 31 have passed through the furnace 45 and the ocular shape of each eye 47 has been formed, the glass sections 31 are removed from their respective carrier 39. Each glass section contains a plurality of ocular shaped eyes 47 corresponding to each pattern 33 printed thereon. Each eye 47 is then diced or otherwise rough cut from the glass section 31. This produces a plurality of wafer like glass sections 49 each containing a manufactured eye 47 approximately in the center thereof. The patterns 33 where positioned on the glass section 31 so that there would be about a 20% waste on the wafer like glass section 49 around the manufactured eye 47. For a 30 millimeter diameter eye 47, this amounts to about 7 millimeters of waste material around the manufactured eye 47. This material is then trimmed away from the manufactured eye 47 to leave a finished bevel, of the type provided by opticians on lenses. This bevel may be flush with the curvature of the eye 47 or it can include an annular lip as will be described below. This waste material is removed with a grinder 51.

For precise results, an optical grinder as commercially available from A.I.T. Industries, fo Schlumbery, Ill. is used. This grinder 51 is known as a model 360, Mark V, Bevel Edger and includes a centering mechanism and chuck mechanism and electronic controls for precise finish grinding. The A.I.T. machine is covered by a plurality of patents, the disclosures of which are incorporated herein by reference. These patents include: Pat. Nos. 3,332,172; and 3,673,738.

The finished product 47 is a glass eye having markings to form the ocular pattern on its inside face 51, this being the back curvature of the eye 47. The finished product eye 47 has a gas fired, polished finish on its front curvature 53. The entire shape of the eye is aspheric, or parabolic with a slight corneal-like enlarged wall thickness at the apex 55 of the curve as will be further described below.

The composite eye pattern 33, such as that used for a deer or a sheep taxidermic eye, includes at least three colors, FIG. 3. This composite pattern 33 has been deposited on a section of glass 31 either by a premanufactured decal or by screening and overlaying or other processes. As the glass section 31 is optically clear, this eye pattern 33 can be seen through the glass 31. This method of depositing the eye pattern 33 on the glass 31 allows for a thinner layer of materials than could be deposited by hand painting, the previous method of decorating. It is both the similarity in the material composition used in creating the pattern 33 to that of the glass 31, and this thinner coating, which contributes to the non-distortion of the deposited pattern 33 during the heat forming operation within the furnace 45.

The glass section 31 shown in FIG. 3 can be manufactured into a single eye 47, FIG. 4. Here the eye 47 projects outwardly, and in the orientation shown, downwardly from the plane of the glass section 31. As can be seen in FIG. 4, the parabolic formation of the eye 47 allows some flow of glass to the apex 55 of the eye 47 to give a slight corneal appearance at this apex 55 location.

FIG. 5 shows perspective view of a finish product eye 47 where the waste portion of the glass section 31 has been completely trimmed away from the eye 47 to leave a ground bevel edge 57 at the base of the eye 47 structure. The inside face 51 of the eye 47, this face 51 carrying the graphic pattern 33, has a concave parabolic shape. The outer face (front curvature) 53 of the eye 47, FIG. 5B is likewise slightly out of round with a generally parabolic outer shape. When the eye 47 has been manufactured from, as an example, 3 millimeter thick glass section 31, the edge 57 is approximately 3 millimeters wide.

FIGS. 6B and 6C show an eye 47 identical to that of the eye 47 shown in FIG. 5A and 5B, except that a portion of the waste material from the section of glass 31 has been left at the base edge of the eye 47 to form an annular lip 59. When the eye 47 is made from 3 millimeter glass, the lip projects outwardly about 3 millimeters and, of course, is likewise 3 millimeters thick. FIG. 6C shows a diametrical cross section through the center of the eye 47. Here the slight pooling of the glass material while in the plastic state caused by the internal flow of glass within the boundaries of the surface or skin of the glass sheet to form the increased thickness of the wall of the eye 47 at the apex 55 of the curve can be seen. As there is a slight difference in the curvature of the parabolic shape of the inside face 51 and the outside face 53, the eye 47 will show a small clear section of glass at the apex 55 when viewed from an angle or from the side.

The depth dimension of the eye 61 can be adjusted for a fixed mold opening 41 size where the mold opening 41 establishes the base diameter 63 for the eye 47. This depth dimension 61 can be about 11 millimeters when the base diameter 63 of the eye 47 is about 30 millimeters. This will provide a ratio of base diameter 63 to depth dimension 61 of about a factor of 3 to 1, or a multiplication factor of 3. This ratio can be changed, even though the base diameter 63 is held to 30 millimeters by the size of the mold 41 opening, by allowing the glass section 31 to stay in the plastic state for a longer period of time.

The furnace 45 has programmable adjustments for belt speed and zone temperature. The conveyer belt 43 can be run intermittently or its speed can be held constant or increased or decreased. The furnace 45 is operated so that its heating is in the medium infrared wavelength region. With this range of heating, approximately 600 degrees centigrade to 900 degrees centigrade, the plastic state of the glass section 31 and its softening and deforming under its own weight, will not be affected by the coloring of the pattern 33 on the top surface of the section 31 as it passes through the furnace 45.

Other types of glass sheet 27 can be chosen for the manufacturing of the glass eye 47. These could include boro-silicate and quartz glass. In these instances the softening temperatures generated within the furnace 45 will have to change as boro-silcate glass softens in the range of 1200 degress centigrade and quartz glass softens in the range of 1600 degress centigrade. The Schott glass chosen above begins to soften at about 750 degrees centigrade.

FIG. 7 is a top plan view of the carrier mold 39 with a preprinted section of glass 31 placed on top of it. This glass section 31 carries two eye patterns 33. In this instance, the carrier mold 39 has two openings 41. The spacings are identical for the patterns 33 and the openings 41. Each of the patterns 33 is positioned over an opening when the preprinted section of glass 31 is placed on top of the carrier 39, FIG. 8.

In the instance where the carrier mold 39 is made out of steel, it can be treated with calcium carbonate or with powdered graphite mixed in an aqueous solution or with chalk. These materials being used as mold releases to allow the heat formed eye and its waste material to be easily removed from the carrier mold 39 after the heating step.

As an alternative to making the carrier mold 39 out of steel and using a mold release material, the carrier mold 39 can be made out of processed carbon or graphite. This carbon structure, however, is not as durable as a steel carrier mold 39 and needs an inert heating atmosphere to reduce its deterioration. Carbon, however, eliminates the need for a mold release material.

The carrier mold 39 when made of steel, shown in a side elevation with the glass section 31 in place, FIG. 9, is about 2 millimeters in thickness. The expansion rate of the glass section 31 can be anywhere from approximately 8 to 99 parts in 10 million per degree centigrade, depending upon the grade of glass chosen.

The carrier mold 39 can be made of different types of steel. Plan carbon steel can be used, such as AISI-SAE 1020. It has a linear coefficient of expansion of approximately 6.7 microinches per degree Fahrenheit, or approximately 0.00030632 millimeters per degree centigrade. This difference in expansion, of course, becomes inconsequential when it is remembered that the forming process if done with the glass section 31 in the plastic state so that any expansion in the size in the carrier 39 circular opening 41 during the forming process will not be critical as it can only affect a minute region at the base of the manufactured eye 47 which is normally refinished during the grinding step 23 following annealing.

FIG. 9 and FIG. 10 show cross section views, taken along the center of the FIG. 7 double eye mold 39, before (FIG. 9) and after (FIG. 10) heat formation in the furnace 45. FIG. 9 illustrates how the section of glass 31 bridges over the circular openings 41 in the carrier mold 39. This carrier mold 39 can have any number of side walls 65 which act as legs. It can also have a bottom base or foot 67. The purpose of the side walls or legs 65 and foot 67 is to provide a secure and stable platform for the top wall 69 of the carrier mold 39. It is important only that the top wall 69 remain horizontal and stable during the manufacturing process as the slump formation relies upon gravity, i.e., the gravitational pull of the earth, for the movement of the glass during the heat forming operation.

As can be realized from observing the before and after cross sections of FIG. 9 and FIG. 10, it is important that the patterns 33 on the glass section 31 remain properly positioned over a respective circular opening 41 during the entire length of the travel along the conveyer belt 43 through the furnace 45 and the heat forming operation. The furnace apparatus 45 chosen for this manufacturing process has its conveyer belt 43 properly leveled. Further, the operation of this conveyer belt 43 is sufficiently smooth that the glass section 31 is not jarred out of position during the travel time on the conveyer belt 43.

If other pieces of equipment are substituted for this conveyer belt 43 and furnace 45, it may be necessary to provide a carrier mold 39 with positioning guides. Positioning guides aid in proper alignment during assembly of a glass section 31 and carrier mold 39 and act to keep the glass section 31 in place after assembly. FIG. 7a shows a modification to the carrier mold 39. This mold carriers four positioning guides 71 on the top face of the top wall 69 through which the pair of circular openings 42 extend. These positioning guides 71 assure a proper position of a glass section 31 on the carrier mold 39 so that the patterns 33 are properly aligned over the circular opening 41 and remain so during the travel along the conveyer belt 43. This, speeds the alignment of the glass section 31 when it is placed on a carrier mold 39 and increases the operational rate of the manufacturing process while maintaining proper quality control.

Naturally, it is understood that the size and spaces between each pattern 33 placed on each section of glass 31 is to be properly correlated to the size and spacing between the openings 41 of the carrier mold 39 being used.

In production, a jig is implemented to assure proper spacing and positioning of the patterns 33 on the glass section 31. This technology is well known and need not be further developed here.

The heating of the glass section 31 in order to create the slump formation will be further discussed below in connection with the conveyer 43 furnace 45 apparatus described above and in connection with alternative types of batch process steps described below.

Figure 11:
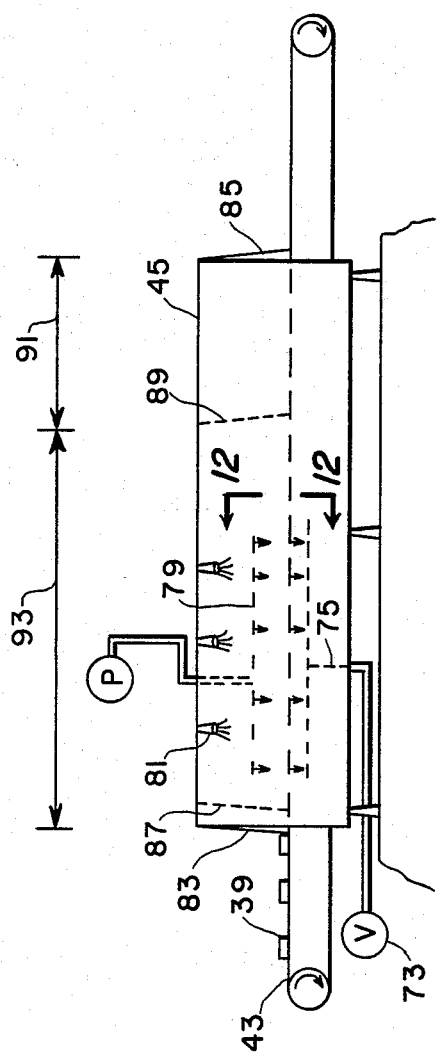
FIG. 11 is a side elevation view of alternative design for the furnace used in the heating step (E) of FIG. 2 to include pressure and vacuum piping.

The furnace 45 can be modified to add a vacuum pump 73 with vacuum piping 75 and a pressure pump 77 with pressure piping 79, FIG. 11. With the BTU Engineering Corporation furnace 45 which is gas fired this pressure piping 79 and vacuum piping 75 must be positioned about the conveyer belt 43 away from gas jets 81 utilized in this furnace 45.

The pressure on the top face of the glass section 31 and vacuum below the glass section 31 enhances the shape forming operation. This will allow variations in the depth dimension 61 for a fixed base diameter 65 size and will increase the rate at which the heat slump operation occurs. This lends to an increase in the production rate through the furnace 45.

The furnace 45 as supplied by the manufacturer comes with an inlet door 83 and an outlet 85. This vacuum and pressurization of the furace 45 might require a second inlet door 87 and a second outlet door 89 to enhance the pressure sealing of the interior of the furnace 45. Likewise, an extension section 91 could be added to the pre-existing length 93 of the furnace 45. The second outlet door 89 would be positioned to separate the extension section 91 from the original or pre-existing length 93. It is to be noted that the gas jets 81 are only positioned within the original or existing length 93.

Figure 12:
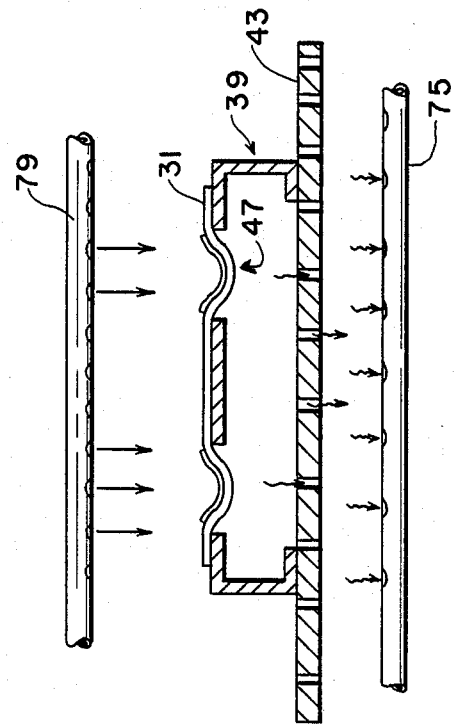
FIG. 12 is a cross sectional elevation view of the piping, conveyor belt and carrier mold in the furnace taken as shown in FIG. 11.
Figure 16:
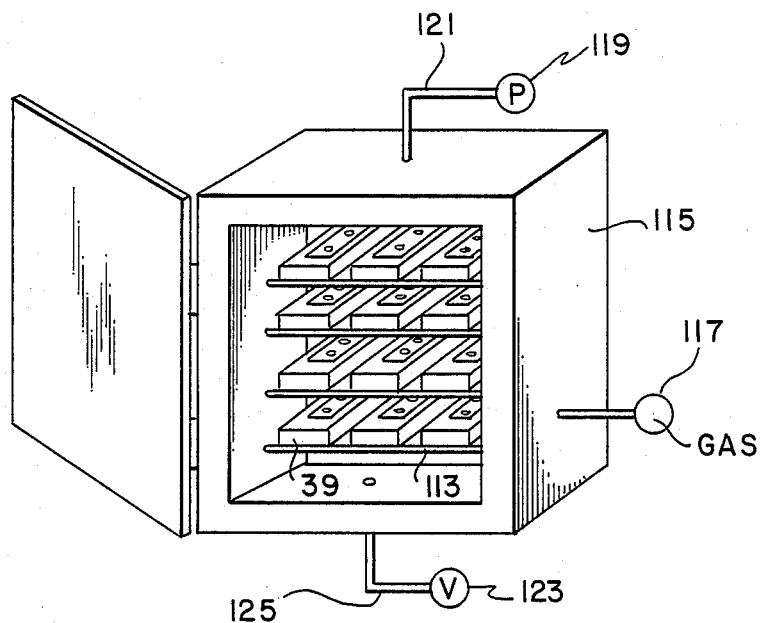
FIG. 16 shows a perspective representation of a batch process autoclave apparatus having vacuum and pressure connections and usable as an alternative heat forming apparatus.

The conveyer belt 43, as supplied by the manufacturer, FIG. 12, is of chain link configuration which will allow the passage of air. The vacuum piping 75 is positioned below the chain link conveyer belt 43 while the pressure piping 79 is positioned above the conveyer belt 43. The piping 79 and 75 can run along the length of the conveyer belt 43 or can transverse this belt 43. It is immaterial as to which direction of orientation the vacuum piping 75 runs, but the positioning of the pressure piping 79 longitudinally, along the length of the conveyer belt 45 may act as an infrared shade if positioned directly above the line of flow of the eye pattern 33.

The conveyor belt 43 and furnace 45 are controlled to operate according to pre-selected parameters. The controls 47 are adjusted to provide the operation illustrated in FIG. 13. Here the BTU Engineering Corporation furnace 45 is five feet long and is operated to have five separate temperature zones. Each temperature zone is approximately one foot long. These temperature zones are established by the heat rate of the gas jets 81 in that region. The manufacturing process heat formation parameters shown in FIG. 13 are established for a 30 millimeter base diameter 63 and a 10 millimeter depth dimension 61 eye 47 made from a 3 millimeter sheet.

The conveyer belt 43 speed is selected to be five inches per minute. The loading region (feed length) 43a of the conveyer belt 43 is two feet long, while the cooling region (discharge length) 43b on the discharge side of the furnace 45 is eleven feet long.

The furnace 45 is operated so that the first zone 95 is held at 675 degrees centigrade, while the second zone 97 is held at 725 degrees centigrade, the third zone 99 is held at 775 degrees centigrade, the fourth zone 101 is held at 825 degrees centigrade and the last or fifth zone 103 is held at 875 degrees centigrade.

The manufacturer of the furnace 45 allows for proportional band setting between zones. This means that there can be a temperature gradients between zones of varying amounts. The process established by this invention and illustrated in FIG. 13 uses a constant temperature gradient between zones which is a temperature gradient of 50 degrees centrigrade. The equipment is capable of holding the set point of each zone to plus or minus 2 degrees centigrade.

FIG. 14 illustrates a nine inch wide conveyer belt 43 carrying a plurality of carrier molds 39 through the heat forming process at a given time. These carrier molds 39 are each approximately four inches long and approximately two and a half inches wide.

The temperature gradient curve for the operation illustrated in FIG. 13 is shown in FIG. 15. Here the ordinate axis 105 is plotted in time in minutes while the abscissa axis 107 is plotted in temperature in degrees centigrade. The five temperature zones 95, 97, 99, 101, and 103 are shown in a bar graph region 109.

With a belt speed of five inches per minutes it takes each carrier mold 39 twelve minutes to travel the length of the furnace 45 when this furnace is five feet long nd has the five heat zones 95, 97, 99, 101, and 103. The cooling region 43b at the discharge end of the conveyer belt 43 allows for a cool down time of approximately twenty-six and a half minutes during which time annealing occurs. When glass sections 31 are loaded at an ambient temperature of 17.5 degrees centigrade and removed at the end of the cooling region 43b at 20 degrees centigrade, the process time from load to unload is approximately 38.5 minutes for each section 31.

The temperature curve 111 shows the instantaneous temperature of each glass section 31 as it is passed through this heat forming portion of the manufacturing process with the parameters discussed above in connection with FIG. 13. The temperature curve 111 is superimposed on this graph, FIG. 15.

As an alternative to the conveyer belt 43 and furnace 45 continuous heat forming manufacturing step described above, the heat forming can be implemented by a batch process. When a batch process if utilized, a plurality of carrier molds 39 are mounted in racks 113 of an autoclave unit 115, FIG. 15. The autoclave 115 can be selected from any of a number of industrial suppliers and manufacturers including autoclaves designed in the clinical and laboratory or scientific range of sizes, as supplied by Hull Corporation of Willow Grove, Pa., and those very large, room size units, as supplied by Melco Steel Company of Detroit, Mich.

Most autoclaves 115 are gas fired 117 and include the capability of adding a pressure pump 119 and pressure piping 121 to the autoclave as well as a vacuum pump 123 and vacuum piping 125 to this autoclave 115.

The purpose in the pressure and vacuum pump structure 119, 121, 123, 125, whether applied to the continuous operation furnace 45 or in the batch process implemented with an autoclave 115 is to create a pressure gradient or a pressure difference between the top surface of a glass section 31 and the bottom surface of that glass section 31 during the heat forming operation. This pressure difference is not needed and a very successful mass production method is carried out by the invention in its primary embodiment described above. The pressure difference, however, operates to provide a mechanical forming of the eye 47, during its plastic state and tends to make the inside face 51 of the eye 47 more round as opposed to parabolic. It tends to set up stresses in the glass from mechanical assisted forming which should be removed by annealing.

When the autoclave 115 is utilized for a batch process, the following soaking equation can be used when there is no pressure gradient set up across the glass section 31. This soaking is accomplished as follows:
 a. 800 degress centigrade for 4.5 minutes
 b. 875 degrees centigrade for the next 10 minutes
 c. 900 degrees centigrade for the next10 minutes
 d. 875 degrees centigrade for the next 10 minutes
 e. 800 degrees centigrade for the next 4.5 minutes
 f. Allow to cool to 125 degrees centigrade
 g. Below 125 degrees centigrade remove from autoclave The heat forming process steps described above with both the continuous process step furnace structure 45 and the batch process step autoclave structure 115 use the Schott optical glass specified above which normally begins to soften around 750 degrees centigrade. Both the continuous operation process step and the alternative batch process step include annealing of this glass after the forming operation is completed.

Figure 17:
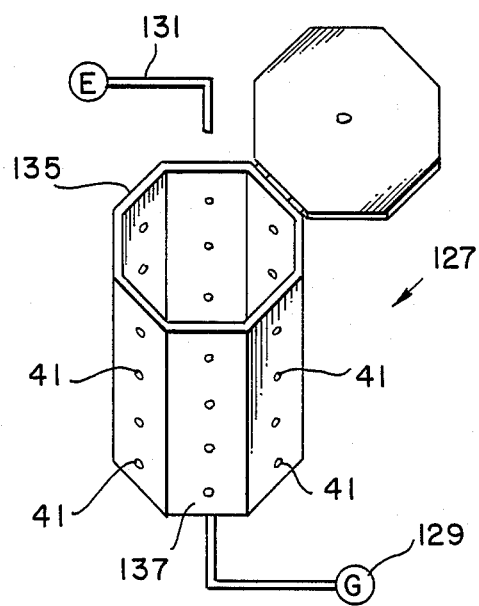
FIG. 17 shows a perspective representation of a batch process centrifuge apparatus having vacuum and pressure connections and usable as an alternative heat forming apparatus.
Figure 18:
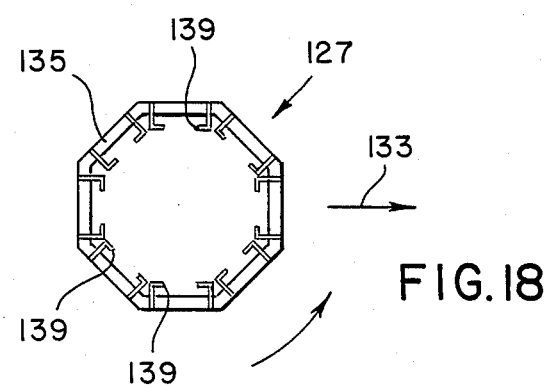
FIG. 18 shows a top plan layout for vertical racks held in the centrifuge apparatus of FIG. 17.

A further alternative to this batch process step equipment, is a centrifuge structure 127, FIG. 17. This device can be outfitted with a heat source such as gas 129 and can include evacuation pumping 131. With this centrifuge 127 structure, there is no need for air pressure gradient across any glass section 31 processed in the centrifuge. The centrifugal forces 133, FIG. 18, developed as the centrifuge 127 spins provide a mechanical pull on the glass flow during the heat forming operation on each section of glass 31.

The centrifuge 127 can be structured to have an octagon shaped solid walled basket 135. Each eall 137 of this basket 135 can have a plurality of circular openings 41. These walls 137 and these openings 41 act as the carrier mold 39 and the circular openings 41 previously discussed above.

Figure 19:
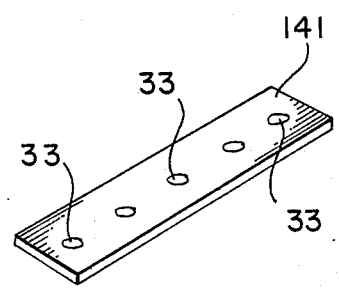
FIG. 19 shows a perspective view of an elongate glass section carrying a plurality of eye patterns and intended to be held in the centrifuge apparatus of FIG. 17.

Vertical guides 139 are installed on the inside face of each basket 135 wall 137. Each vertical guide can hold an elongate section of glass 141. FIG. 19, having been preprinted with a plurality of eye patterns 33. These patterns 33 are spaced along this elongate section of glass 141 which has been sliced to be an elongated rectangle, although FIG. 19 shows it in a perspective view. The patterns 33 line up with the openings 41 when the elongate glass section 141 is installed within the basket 135 in a respective vertical guide 139.

With this batch type structure, the centrifuge 127 can be spun at a predetermined rate of revolutions per minute or its rotational rate can be increased as each elongate section of glass 141 reaches its plastic temperature state.

Likewise, the temperature of the interior of the centrifuge can be maintained at one constant temperature level or the temperature can be gradually increased to the softening temperature of approximately 750 degrees centigrade and there beyond to anneal the glass in each formed eye 47. A temperature curve such as the curve 111 shown in FIG. 15 can be followed, or a soaking chart as described above in connection with the autoclave 115 batch process can be followed.

The centrifugal forces provided by the centrifuge 127 makes an eye 47 with not only a parabolically shaped front curvature 53 as in the primary embodiment (furnace 45 nonpressure gradient) above, but also a parabolically shaped inside shape 151 unlike that generally produced with the autoclave 115 or the continuous process furnace 45, when a pressure gradient is provided.

In the instances where the carrier mold 39 is constructed of carbon, an inert atmosphere such as nitrogen is used within the heating apparatus as it greatly increases the working life of each carrier mold 39. Likewise, when the basket 135 of the centrifuge 137 is made of steel, the mold release as described above should also be used.

It will be understood by those skilled in the art that modifications can be made to the above described invention without departing from the scope and intent of the invention. Accordingly, it is intended that the scope of the invention is not to be limited by the scope of the foregoing description, but solely by the scope of the hereafter appended claims when interpreted in light of the pertinent prior art. The above description is to be considered as illustrative of the invention and not as limiting the invention to the particular embodiments described.

What is claimed is:

1. A method of manufacturing glass eyes comprising the following steps:
  selecting a sheet of glass of a thickness appropriate for approximate wall thickness of the manufactured eye;
  depositing a graphic pattern on one side of said sheet, said pattern being the graphics for the eye;
  placing said patterned sheet of glass on a pallet containing an opening, said opening determining the base curvature for the eye;
  heating said patterned sheet of glass on said pallet into the plastic state to cause said to slump through said pallet opening;
  further heating said slumped patterned sheet of glass above the initial plastic state to cause said glas to flow internally thereby forming a free-form generally parabolic outer shaped eye;

allowing the formed eye to cool; and trimming any excess glass material away from the formed eye.

2. The method of claim 1 wherein said placing step includes placing said patterned sheet of glass on a pallet containing a circular opening whereby said graphic pattern is centered over said circular opening.

3. The method of claim 2 wherein said depositing step includes printing a circular graphic pattern.

4. The method of claim 3 wherein said heating step includes heating said sheet of glass to its annealing temperature prior to said cooling step.

5. The method of claim 4 wherein said cooling step is conducted in an ambient temperature environment.

6. The method of claim 5 wherein said depositing step is accomplished by placing a decal on said glass sheet.

7. The method of claim 5 wherein said depositing step is accomplished by placing successive layers of different colors on said glass sheet to develop a composite pattern desired.

8. The method of claim 6 wherein said depositing is in vitreous enamels.

9. The method of 8 wherein said trimming step removes all material from the base of said formed eye.

10. The method of claim 8 wherein said trimming step leaves an annular lip about the base of said formed eye.

11. The method of claim 9 wherein said trimming step is carried out by grinding.

12. The method of claim 11 also including a course-cutting step prior to said trimming step to remove a portion of the waste glass about said formed eye.

13. The method of claim 1 wherein said further heating step is extended in time and at a temperature to allow said glass sheet to remain in the plastic flow state to form a pool of glass at the apex of said generally parabolic shape, said pool of glass resulting in increased wall thickness of the glass about said apex region.

14. The method of claim 13 wherein said heating step and said further heating step are both carried out by passing said pallet carrying patterned sheet of glass through a furnace on a conveyor belt.

15. The method of claim 14 also including the step of creating a pressure gradient across the patterned glass sheet during said heating step, this pressure gradient providing a greater pressure on the pattern side of said glass sheet than the opposite side.

16. The method of claim 13 wherein said heating step and said further heating step are both carried out by heating said pallet carrying patterned sheet of glass in an autoclave oven.

17. The method of claim 16 also including the step of creating a pressure gradient across the pattern glass sheet during said further heating step, this pressure gradient providing a greater pressure on the pattern side of said glass sheet than the opposite side.

18. The method of claim 13 wherein said heating step and said further heating step are both carried out by heating said pallet carrying patterned sheet of glass in a centrifuge oven.

19. The method of claim 18 wherein said pallet carrying patterned glass sheet is positioned in said centrifuge with the pattern side of said glass sheet facing inwardly and wherein said centrifuge is spun while said glass sheet is in said heated plastic state.

20. The method of claim 7 wherein said depositing is in vitreous enamels.

21. The method of 20 wherein said trimming step removes all material from the base of said formed eye.

22. The method of claim 20 wherein said trimming step leaves an annular lip about the base of said formed eye.

23. The method of claim 22 wherein said trimming step is carried out by grinding.

24. The method of claim 23 also including a course-cutting step prior to said trimming step to remove a portion of the waste glass about said formed eye.

25. The method of claim 24 wherein both said heating step and said further heating step are carried out when passing said pallet carrying patterned sheet of glass through a furnace on a conveyer belt.

26. The method of claim 24 wherein both said heating step and said further heating step are carried out in an autoclave oven.

27. The method of claim 24 wherein both said heating step and said further heating step are carried out in a centrifuge oven.

28. The method of claim 25 also including the step of creating a pressure gradient across the patterned glass sheet during both its heated slumping state and its further heated plastic flow state, this pressure gradient providing a greater pressure on the pattern side of said glass sheet than the opposite side.

29. The method of claim 26 also including the step of creating a pressure gradient across the pattern glass sheet during both its heated slumping state and its further heated plastic flow state, this pressure gradient providing a greater pressure on the printed side of said glass sheet than the opposite side.

30. The method of claim 27 wherein said pallet carrying patterned glass sheet is positioned in said centrifuge with the pattern side of said glass sheet facing inwardly and wherein said centrifuge is spun while said glass sheet is in both said heated slumping state and in said further heated plastic flow state.

31. A method of making a prosthesis-type eye comprising the steps of:

selecting a sheet of optical quality glass of from range of about 1 millimeter to about 5 millimeters in thickness;

imparting a graphic pattern for an eye on one side of said glass sheet in vitreous enamels;

placing said printed glass sheet over an open hole mold;

heating said printed glass sheet and said mold to allow said glass sheet to slump freely through said mold open hole while in the heated plastic state;

further heating said slumped glass sheet to cause said glass to internally flow said flow thereby forming a free-formed generally parabolic outer shape.

32. The method of claim 31 wherein said open hole mold is selected to have a flat surface which is suspended horizontally and through which said glass sheet slumps forming a round base for the eye while in said heated plastic state and wherein said glass flow forms a pool of glass to form a thickened wall about the apex region of said generally parabolic shape.

33. The method of claim 31 wherein said graphic pattern is centered over said circular hole during said heat slumping.

34. The method of claim 33 wherein said pattern is on the side of said glass sheet away from said circular hole.

35. The method of claim 31 wherein said heating step is conducted according to the following heat soaking times:

(a) heating at about 675 degrees centigrade for about 4.5 minutes; and wherein said further heating step is conducted according to the following heat soaking times:
(b) heating at about 875 degrees centigrade for about the next 10 minutes;
(c) heating at about 900 degrees centigrade for about the next 10 minutes;
(d) heating at about 875 degrees centigrade for about the next 10 minutes;
(e) heating at about 800 degrees centigrade for about the next 4.5 minutes;
(f) allowing to cool slowly to about 125 degrees centigrade; and
(g) cooling more raidly thereafter to ambient temperature.

36. The method of claim 31 wherein said heating and further heating steps are conducted as follows:
(a) heating in an environment of 675 degrees centigrade for about 2.4 minutes;
(b) then heating in an environment of about 725 degrees centigrade for about 2.4 minutes;
(c) then heating in an environment of about 825 degrees centigrade for about 2.4 minutes;
(d) then heating in an environment of about 875 degrees centigrade for about 2.4 minutes; and
(e) then cooling under ambient conditions for about 26.5 minutes.

37. A method of operating a heating system for making a-spherical shaped glass eyes comprising the steps of:
loading patterned glass sections on a mold pallet containing a plurality of circular holes, one each said hole corresponding to each individual patterned glass section and in alignment therewith;
placing said loaded mold pallet on a conveyor belt, one end thereof being a loading section;
operating said conveyor belt at an adjustable but predetermined fixed speed;
positioning a furnace about a portion of said conveyor belt downstream from said loading section and establishing a discharge section of said conveyor belt following said furnace;
wherein said furnace is programmably operated with a plurality of different sequential heat zones to heat said glass sections passing there through uniformly from above and below by heat in the infrared range, first into the plastic temperature state to cause each said glass section to slump; and
wherein said furnace is further programmably operated in a plurality of further different sequential heat zones to heat said glass sections passing therethrough into the plastic flow state wherein said glass internally flows to form a generally a-spherical type shape with a pooling of glass forming a thicker wall at the apex region thereof.

38. The method of claim 37 wherein said conveyor belt is operated at a travel speed of five inches per minute and wherein said discharge section of said conveyor belt is of sufficient length to cool down said glass to about 20 degrees centigrade.

39. The method of claim 38 wherein said furnace different heat zones extending from said loading section side to discharge section side are established at approximately 675, 725, 775, 825 and 875 degrees centigrade, respectively.

40. The method of claim 39 wherein each furnace heat zone is established to extend about one foot along the length of said conveyor belt path.

41. The method of claim 40 wherein said conveyor belt loading section is established at an ambient temperature of about 17 degrees centigrade for a distance of about two feet and wherein said conveyor belt discharge section is established about eleven feet long allowing about 26 minutes for said glass to cool to about 20 degrees centigrade.

42. A method of forming a glass object from a glass sheet comprising the steps of:
placing said glass sheet on a mold, said mold having an opening therethrough being the size and shape of the base portion of the object to be formed;
heating said glass sheet in a predetermined heating sequence to the soften said glass into a plastic state and thereby causing said portion of said glass sheet over said mold opening to slump through said mold opening; and
further heating said glass sheet to a higher temperature to cause a plastic flow of said glass to freeform a generally a-spherical shape.

43. The method of claim 42 also including before the step of heat slumping the step of depositing a pattern in vitreous materials of a portion of one side of a glass sheet; and wherein said plastic flow of said glass forms and apex region wherein said plastic flow condition is continued internally until a build up of a glass pool is created at said apex region.

44. The method of claim 42 wherein said slumping state and plastic flow state are both enhanced by establishing a vacuum on the non-patterned side of said glass sheet.

45. The method of claim 42 wherein said slumping state and said plastic flow state both enhanced by establishing a pressure on the patterned side of said glass sheet portion.

46. The method of claim 42 wherein said slumping state and said plastic flow state are both enhanced by establishing centrifugal forces on the glass sheet portion.

47. A method of forming generally a-spherical shaped glass eyes from pre-patterned flat optical grade glass sections using molds containing open holes wherein the hole diameters establish the base diameter for the eyes, comprising the steps of operating a batch autoclave process as follows:
(a) loading the autoclave with molds containing said open holes with a patterned glass section positioned over each open hole;
(b) heating said autoclave at about 800 degrees centigrade for about 4.5 minutes;
(c) then heating said autoclave at about 875 degrees centigrade for about 10 minutes;
(d) then heating said autoclave at about 900 degrees centigrade for about 10 minutes;
(e) then heating said autoclave at about 875 degrees centigrade for about 10 minutes;
(f) then heating said autoclave at about 800 degrees centigrade for about 4.5 minutes;
(g) then allowing said autoclave to cool while closed to about 125 degrees centigrade; and
(h) then opening said autoclave and allowing said glass to cool under ambient conditions to ambient temperature.

* * * * *

UNITED STATES PATENT AND TRADEMARK OFFICE
CERTIFICATE OF CORRECTION

PATENT NO. : 4,822,397
DATED : April 18, 1989
INVENTOR(S) : John W. Crossley,

It is certified that error appears in the above-identified patent and that said Letters Patent is hereby corrected as shown below:

```
Column 1, line 12, change "thoe" to --those--;
Column 3, line 34, change "thicknes" to -- thickness--;
Column 3, line 65, after "eyes" insert --.--;
Column 3, line 66, after "lenses' insert --,--;
Column 3, line 67, after "invention" insert --.--;
Column 6, line 42, change "fo Schlumbery" to --of Schlumberg--;
Column 7, line 44, change "the" to --this--;
Column 8, line 1, change "boro-silicate" to --borus silicate--;
Column 8, line 3, change "boro-silicate" to --borus silicate--;
Column 9, line 18, change "42" to --41--;
Column 9, line 55, after "outlet' insert --door--;
Column 9, line 65, after"93" insert --.--;
Column 10, line 8, change "45" to --43--;
Column 11, line 6, change "if" to --is--;
Column 11, line 41, after "next" insert a space;
Column 11, line 66 change "eall" to --wall--;
Column 11, line 67, after "41" insert -- . --;
Column 12, line 12, after "139" insert -- . --;
Column 12, line 65, after "to cause said" insert -- sheet --;
Column 14, line 50, after "plastic state," insert -- and --;
Column 16, line 17, after "sequence to" delete -- the --;
```

Signed and Sealed this

Twenty-seventh Day of February, 1990

*Attest:*

JEFFREY M. SAMUELS

*Attesting Officer*   *Acting Commissioner of Patents and Trademarks*